(12) United States Patent
Ng et al.

(10) Patent No.: US 8,941,330 B2
(45) Date of Patent: Jan. 27, 2015

(54) LIGHT SOURCE OPERATION

(71) Applicant: Hewlett-Packard Development Company, L.P., Houston, TX (US)

(72) Inventors: Kay Seah Ng, Singapore (SG); Kay Hoe Ng, Gelang Patah (ML); Chee How Lee, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 127 days.

(21) Appl. No.: 13/848,516

(22) Filed: Mar. 21, 2013

(65) Prior Publication Data

US 2014/0285116 A1    Sep. 25, 2014

(51) Int. Cl.
*H05B 37/02* (2006.01)
*H05B 39/00* (2006.01)
*H05B 41/36* (2006.01)

(52) U.S. Cl.
CPC .................................. *H05B 37/0209* (2013.01)
USPC ........................... 315/308; 315/362; 315/307

(58) Field of Classification Search
CPC ......... H05B 41/36; H05B 39/00; H05B 37/02
USPC ........... 315/32, 362, 307, 149, 312, 150, 294; 340/541, 565, 567
See application file for complete search history.

(56) References Cited

U.S. PATENT DOCUMENTS

| | | | | |
|---|---|---|---|---|
| 6,078,253 | A * | 6/2000 | Fowler | 340/501 |
| 6,388,399 | B1 * | 5/2002 | Eckel et al. | 315/312 |
| 7,449,847 | B2 * | 11/2008 | Schanberger et al. | 315/312 |
| 7,469,361 | B2 * | 12/2008 | Ukrainetz et al. | 714/43 |
| 7,546,167 | B2 * | 6/2009 | Walters et al. | 700/17 |
| 7,546,168 | B2 * | 6/2009 | Walters et al. | 700/17 |
| 7,598,681 | B2 * | 10/2009 | Lys et al. | 315/291 |
| 7,603,184 | B2 * | 10/2009 | Walters et al. | 700/17 |
| 7,642,730 | B2 * | 1/2010 | Dowling et al. | 315/292 |
| 8,009,042 | B2 * | 8/2011 | Steiner et al. | 340/541 |
| 8,010,319 | B2 * | 8/2011 | Walters et al. | 702/183 |
| 8,035,320 | B2 * | 10/2011 | Sibert | 315/312 |
| 8,090,881 | B1 * | 1/2012 | Booth et al. | 710/15 |
| 8,148,851 | B2 * | 4/2012 | Hahnlen et al. | 307/113 |
| 8,164,281 | B2 | 4/2012 | Warton | |

(Continued)

FOREIGN PATENT DOCUMENTS

| | | |
|---|---|---|
| AU | 2010235891 A1 | 5/2011 |
| CN | 102508426 A | 6/2012 |

OTHER PUBLICATIONS

Kerner. HP Networking Deploys New Energy Efficient Ethernet Switches. Dec. 8, 2010.

*Primary Examiner* — Douglas W Owens
*Assistant Examiner* — Wei Chan

(57) ABSTRACT

In one example implementation in accordance with the present disclosure, a process is provided. The process includes entering a first mode of operation where a plurality of light sources are permitted to illuminate. The process further includes entering a second mode of operation where the plurality of light sources associated with the first switch are not permitted to illuminate, and where the entering of the second mode of operation is in response to not detecting a presence for a time period. The process still further includes entering a third mode of operation in response to receiving a command, where only a subset of the plurality of light sources are permitted to illuminate and the remainder of the plurality of light sources are not permitted to illuminate.

20 Claims, 6 Drawing Sheets

(Third Mode)

(56) References Cited

U.S. PATENT DOCUMENTS

| | | | |
|---|---|---|---|
| 8,415,901 B2* | 4/2013 | Recker et al. | 315/307 |
| 8,427,076 B2* | 4/2013 | Bourquin et al. | 315/307 |
| 8,571,719 B2* | 10/2013 | Altonen et al. | 700/287 |
| 8,710,770 B2* | 4/2014 | Woytowitz | 315/307 |
| 8,836,505 B2* | 9/2014 | Noda et al. | 340/541 |
| 2006/0091822 A1* | 5/2006 | Bierman et al. | 315/244 |
| 2007/0236156 A1* | 10/2007 | Lys et al. | 315/291 |
| 2008/0265799 A1* | 10/2008 | Sibert | 315/292 |
| 2010/0201267 A1* | 8/2010 | Bourquin et al. | 315/32 |
| 2012/0013476 A1 | 1/2012 | Dove | |

* cited by examiner

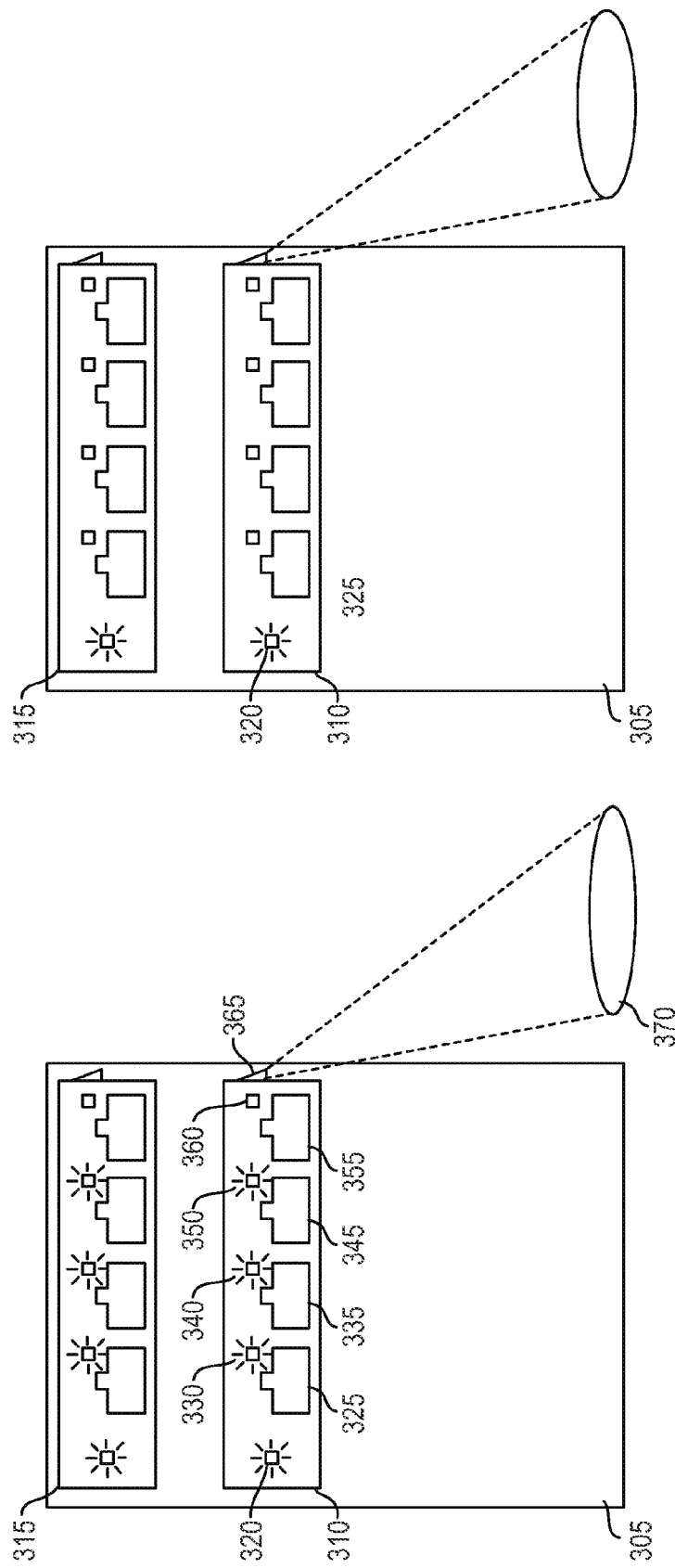

(Third Mode)

(First Mode)

LIGHT SOURCE OPERATION

BACKGROUND

In the networking technology space, a switch is generally a network control device that enables networked devices to communicate with each other in an efficient manner. For example, a switch may serve to connect computers, printers, routers, servers, patch panels, and/or other switches within a building or campus to form a local area network (LAN) and to enable efficient communication therebetween. These connections may be made via cable interconnects such as twisted-pair cables, Ethernet cables, crossover cables, coaxial cables, optical fiber cables, and the like. The cables may include modular connectors or plugs on each end of the cable that insert into ports on the network devices. Each port may have an associated light source to provide a status indication to a viewer such as a network administrator.

BRIEF DESCRIPTION OF THE DRAWINGS

Examples are described in the following detailed description and in reference to the drawings, in which:

FIG. 3(A)-(D) depict a graphical depiction of an example switch in the various modes of operation in accordance with an implementation;

DETAILED DESCRIPTION

Figure 1:
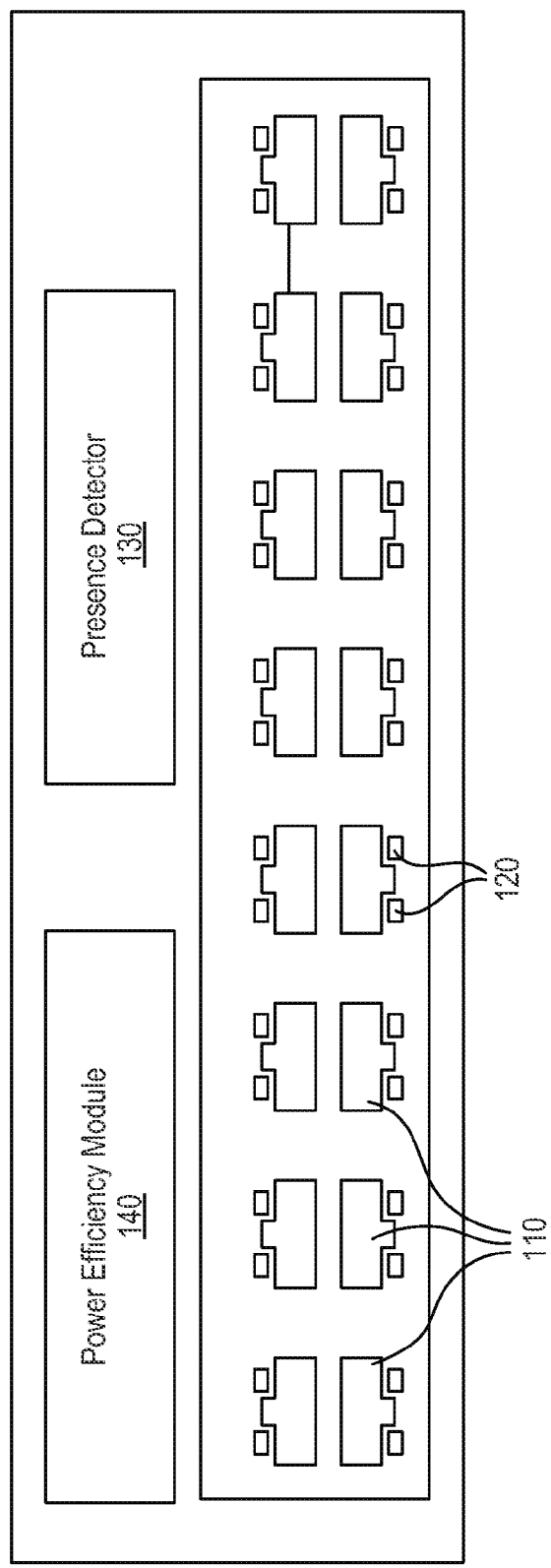
FIG. 1 depicts an example switch in accordance with an implementation.

Various aspects of the present disclosure provide a novel and previously unforeseen approach to reduce power consumption. More particularly, various aspects of the present disclosure reduce power consumption associated with a device such as a switch by controlling light source behavior in an intelligent manner.

As discussed above, network devices such as switches typically include a plurality of light sources to provide status indications to a viewer. For example, a typical switch may include at least one light source associated with each port on the switch to indicate whether or not there is a current link and/or whether or not there is activity on the link. In addition, many switches include other light sources to indicate, for example, the power status, fault status, temperature status, fan status, speed status, current mode, and the like.

When examining the power consumption of an individual light source or even the power consumption of all light sources associated with a single switch, the power consumption over time may appear rather minimal. However, in a large scale enterprise environment, there may be hundreds of switches and therefore thousands of light sources. Since these light sources are typically permitted to illuminate 24/7, the total power consumption of the light sources may be very high. By some estimates, the consumption annually can reach up to 75 kilowatts per hour for 288 ports in a 12 slot switch chassis, and therefore cost around $1500 (USD) annually.

This is rather wasteful given that most network administrators are located away from the switches and interface with the switch through a remote connection. While there are instances when the network administrator may be physically present proximate to the switch for debug purposes, these instances are generally infrequent. Accordingly, aspects of the present disclosure intelligently modify light source behavior to account for the fact that network administrators are typically not present to view the status indications. As a result of this novel and previously unforeseen approach, power consumption may be greatly reduced and thereby provide significant savings to, e.g., the owner/operator of the enterprise system.

In one example in accordance with the present disclosure, a switch is provided. The switch comprises a plurality of ports, a plurality of light sources associated with the plurality of ports, a presence detector to detect a presence proximate to the switch, and a power efficiency module communicatively coupled to the presence detector and the plurality of light sources. The power efficiency module is to cause the first switch to enter a second mode of operation in response to the presence detector not detecting a presence proximate to the first switch for a time period, wherein during the second mode of operation the plurality of light sources associated with the plurality of ports are not permitted to illuminate. The power efficiency module is further to cause the first switch to enter a first mode of operation in response to the presence detector detecting a presence proximate to the first switch, wherein during the first mode of operation the plurality of light sources associated with the plurality of ports are permitted to illuminate. The power efficiency module is yet further to cause the first switch to enter a third mode of operation in response to receiving a first command, wherein during the third mode of operation only a subset of the plurality of light sources associated with the plurality of ports are permitted to illuminate and the remainder of the plurality of light sources associated with the plurality of ports are not permitted to illuminate.

In a further example in accordance with the present disclosure, a process to reduce power consumption is provided. The process comprises entering, by a first switch, a first mode of operation, wherein during the first mode of operation a plurality of light sources associated with the first switch are permitted to illuminate. The process further comprises entering, by the first switch, a second mode of operation, wherein during the second mode of operation the plurality of light sources associated with the first switch are not permitted to illuminate, and wherein the entering of the second mode of operation is in response to not detecting a presence proximate to the first switch for a time period. The process still further comprises re-entering, by the first switch, the first mode of operation, wherein the re-entering of the first mode of operation is in response to detecting a presence proximate to the first switch. The process yet further comprises receiving, by the first switch, a command to enter a third mode of operation, wherein during the third mode of operation only a subset of the plurality of light sources are permitted to illuminate and the remainder of the plurality of light sources are not permitted to illuminate. Thereafter, the process comprises entering, by the first switch, the third mode of operation, pursuant to the command.

In yet another example in accordance with the present disclosure, a non-transitory machine readable medium is provided. The non-transitory machine-readable medium comprises instructions which, when executed, cause a device (e.g., a switch, server, Blade server, hard disk drive assembly, etc.) to enter a second mode of operation in response to not detecting a presence proximate to the device for a time period, wherein during the second mode of operation a plurality of light sources are not permitted to illuminate. The instructions, when executed, may further cause the device to enter the first mode of operation in response to detecting a presence proximate to the device, wherein during the first mode of operation the plurality of light sources are permitted to illuminate. Additionally, the instructions, when executed, may further cause the device to enter the third mode of operation in response to receiving a first command, wherein during the third mode of operation only a subset of the plurality of light sources are permitted to illuminate and the remainder of the plurality of light sources associated with the plurality of ports are not permitted to illuminate. Furthermore, the instructions, when executed, may further cause the device to re-enter the first mode of operation in response to receiving a second command.

FIG. 1 depicts an example switch 100 in accordance with an implementation. The switch 100 comprises a plurality of ports 110, a plurality of light sources 120, a presence detector 130, and a power efficiently module 140. It should be readily apparent that the switch 100 depicted in FIG. 1 represents a generalized illustration and that other components may be added or existing components may be removed, modified, or rearranged without departing from a scope of the present disclosure. For example, the switch 100 may comprise more, less, and/or different ports 110 and/or light sources 120 than those shown in FIG. 1.

The ports 110 may be generally understood to be physical connection points on the switch 100. The ports 110 may receive a male plug in a female receptacle and allow for inbound/outbound communication along the cable interconnect associated with the male plugs. For instance, the switch 100 may be an Ethernet switch and the port may be arranged to receive a RJ45 or 8P8C plug to enable Ethernet communication.

The ports 110 may each have associated light sources 120. These light sources 120 typically provide a status indication related to, e.g., activity, link, speed (e.g., 100BASE-TX, 10BASE-T, 1000BASE-t, etc.), transmit, receive, power over Ethernet (PoE) and/or mode, but may provide other status indications in accordance with aspects of the present disclosure. For instance, the light sources 120 may provide an indication related to a status of another port, such as the port located directly below.

The light source 120 may be a light emitting device (LED), an incandescent light source, a fluorescent light source, a neon light source, or any other type of light source. While two light sources 120 are shown per port 110 in FIG. 1, it should be understood that other arrangements may occur (e.g., 1 light source per port, 3 light sources per port, etc.). In addition, while light sources 120 are only shown with respect to ports 110, it should be understood that non-port light sources may be included. For example, the non-port light sources may be located away from the ports 110 to provide status indications related to, for example, power, fault, locator, PoE, temperature, fan, test, modes, full duplex, speed, user, power supply, stack, compact flash, DIMM, chassis, internal power supplies, external power supplies, modules, light source modes, auxiliary port, standby, etc.

The presence detector 130 is generally a sensor to detect presence of an object (stationary or moving) proximate to the switch 100. For example, the presence detector 130 may detect whether an object is within 3 feet of the front of the switch 100, regardless of whether the object is stationary or moving. The sensitivity of the presence detector 130 may be adjustable to control how proximate the user has to be to the switch 100 for the presence detector 130 to detect the user's presence (e.g., 1 ft., 5 ft., 10 ft. etc.). The presence detector 130 may utilize, for example, passive/active infrared detection, heat detection, camera detection, image detection, ultrasound detection, sound detection, radio frequency (RF) detection, microwave/radar detection, video detection, laser detection, ultrasonic detection, topographic detection, or the like.

The power efficiency module 140 may be communicatively coupled to the presence detector 130, ports 110, and/or light sources 120. The power efficiency module 140 may monitor presence detection information received from the presence detector 130, and based thereon, intelligently control the light sources 120 behavior to minimize power consumption. The power efficiency module 140 may comprise software, hardware, or a combination of both. For example, the power efficiency module 140 may comprise instructions executable by a processing device to cause the switch 100 to conduct functions discussed herein. Alternatively or in addition, the power efficiency module 140 may comprise a hardware equivalent such as an application specific integrated circuit (ASIC), a logic device (e.g., PLD, CPLD, FPGA, PLA, PAL, GAL, etc.), or combination thereof.

In some implementations, and as discussed in greater detail below with reference to FIGS. 2-5, the power efficiency module 140 may intelligently control the switch 100 to transition between various modes of operation based on information received from the presence detector 130 and/or information received from a user computing device communicatively coupled to the switch via, e.g., a debug, console, management, or other similar port. For instance, the power efficiency module 140 may cause the switch 100 to transition from a high power consumption first mode of operation to a low power consumption second mode of operation in response to receiving information from the presence detector 130 indicating that object presence has not been detected for a predetermined time period (e.g., 1 minute). Similarly, the power efficiency module 140 may cause the switch 100 to transition from the low power consumption second mode of operation to the high power consumption first mode of operation in response to receiving information from the presence detector 130 indicating that object presence has been detected. Additionally, the power efficiency module 140 may cause the switch 100 to transition from the high power consumption first mode of operation to a low power consumption third mode of operation in response to a command received from a user computing device communicatively coupled to the switch via, e.g., a debug, console, management, or other similar port.

Figure 2:
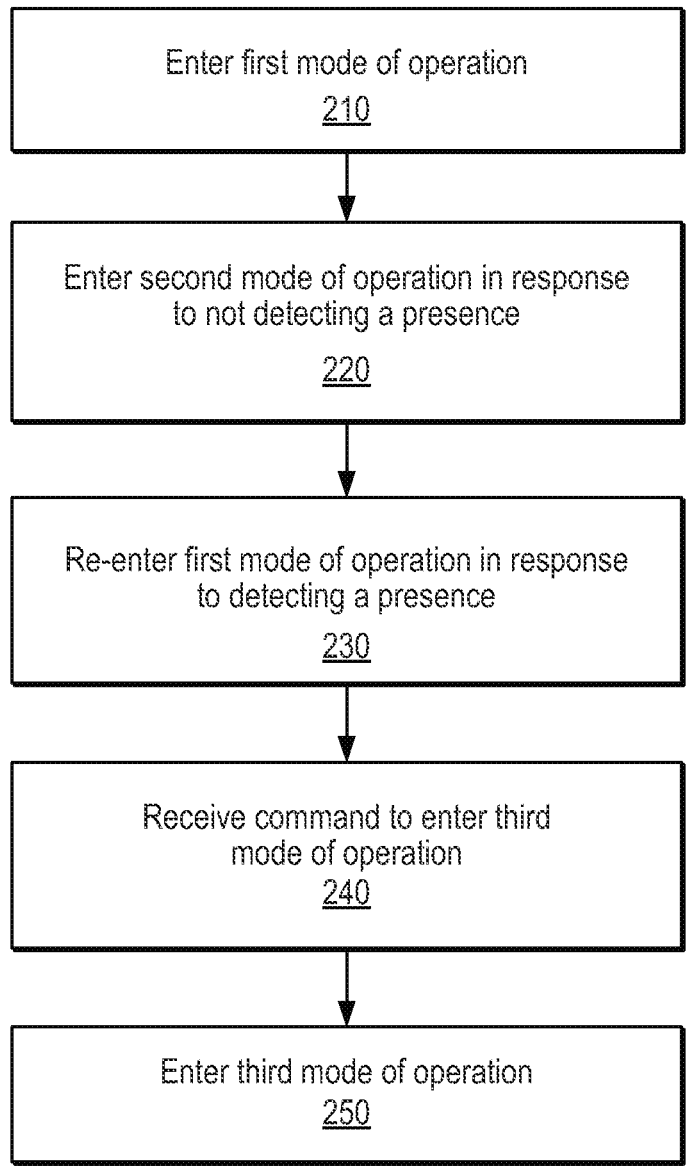
FIG. 2 depicts an example process flow diagram for reducing power consumption in accordance with an implementation.

FIG. 2 depicts an example process flow diagram 200 in accordance with an implementation. It should be readily apparent that the processes depicted in FIG. 2 represent generalized illustrations, and that other processes may be added or existing processes may be removed, modified, or rearranged without departing from the scope and spirit of the present disclosure. In addition, it should be understood that the processes may represent instructions stored on machine-readable storage medium that may cause a processor to respond, to perform actions, to change states, and/or to make decisions. Alternatively or in addition, the processes may represent functions and/or actions performed by functionally equivalent circuits like an analog circuit, a digital signal processing device circuit, an ASIC, and/or a logic device associated with a switch. It should be understood that FIG. 2 is not intended to limit the implementation of the present disclosure, but rather the figure illustrates functional information that one skilled in the art could use to design/fabricate circuits, generate software, or use a combination of hardware and software to perform the illustrated processes.

The process 200 may begin at block 210 when the switch enters a first mode of operation. The switch may enter this first mode of operation, for example, after startup/initiation/boot-up processes are complete, or after completion of other modes and where the switch is returning to this initial state. During this first mode of operation, the plurality of light sources are permitted to illuminate. As used herein, "permitted to illuminate" generally means that the switch can illuminate the light source if there is a reason to illuminate the light source (e.g., the associated port is receiving data), but does not have to illuminate the light source if there is no reason to illuminate the light source (e.g., the associated port is not receiving data). Stated differently, "permitted to illuminate" does not mean the light sources is necessarily illuminated, but rather that the light source can illuminate if the situation dictates so. For example, the switch may have a light source that illuminates when a cable is plugged into the port to indicate a link is established. In the first mode of operation where the light source is "permitted to illuminate," the light source would be illuminated if the cable is plugged into the port, but would not be illuminated if the cable is not plugged into the port At block 220, the switch enters a second mode of operation in response to not detecting a presence for predetermined time period. As mentioned previously, the switch comprises a presence detector, and this presence detector may be initiated during the startup/initiation/boot-up processes, or during the block 210. Regardless of when it occurs, once initiated, the presence detector will detect moving and/or stationary objects proximate to the switch (e.g., moving and/or stationary objects within 5 ft. of the front of the switch). In the event that no presence is detected for a predetermined time period (e.g., 45 seconds), the switch may enter the second mode of operation. This second mode of operation is generally a low-power operational mode where the plurality of light sources associated with the switch are not permitted to illuminate. This does not mean that all light sources on the switch cannot illuminate, but rather that the above-referenced plurality of light sources cannot illuminate. For example, the plurality of light sources may refer to all port light sources on the switch. Therefore, during the first mode of operation, these port light sources would be permitted to illuminate, and during the second mode of operation these port light sources would not be permitted to illuminate. However, during the second mode of operation, other light sources may illuminate. For example, there may be a light source that continuously illuminates to show that the switch is powered-on. This power-on light source may illuminate during the second mode of operation, while the port light sources may not. Thus, during the second mode of operation, the switch is in a low-power state, as power is not being consumed to illuminate the plurality of light sources (e.g., port light sources).

At block 230, the switch re-enters the first mode of operation in response to the presence detector detecting a stationary/moving object proximate to the switch. As mentioned above with respect to block 210, during the first mode of operation, the plurality of light sources are permitted to illuminate. Hence, in response to detecting a presence (e.g., an administrator in front of the switch), the switch can automatically transition from the low power second mode of operation where a majority of the light sources may be disabled, to the high power first mode of operation where the majority or all light sources are permitted to illuminate. Thus, for example, an administrator looking to resolve a problem can promptly identify a malfunctioning port based on the status indicators.

At block 240, the switch receives a command to enter a third mode of operation, and at block 250 enters the third mode of operation, where only a subset of the plurality of light sources are permitted to illuminate and the remainder of the plurality of light sources are not permitted to illuminate. This command may be received from a computing device (e.g., the administrator's laptop) that is separate from the switch but communicatively coupled to the switch. For example, in response to identifying a malfunctioning port which the administrator would like to debug during block 230, the administrator may communicatively couple his/her computing device to the switch via, for example, a debug, console, management port, or the like. Once communicatively coupled with the switch, the administrator may issue a command from the computing device (e.g., a laptop) to the switch to enter the third mode of operation where only the light source associated with the malfunctioning port is permitted to illuminate, but the remainder of the plurality of light sources are not permitted to illuminate. Thus, during this debug time period (e.g., 90 minutes), power is not wasted illuminating non-malfunctioning port light sources.

Depending on the implementation, the command may be sent from the administrator's computing device using a command line interface (CLI) or any other application arranged to communicate with the switch. Also, depending on the implementation, the administrator may communicatively couple with the switch via a wired connection (e.g., plug into console port) or a wireless connection (e.g., 802.11, Blue-tooth, IR, etc.).

Furthermore, once the administrator has completed debugging the malfunctioning port, the administrator may issue another command to the switch to re-enter the first mode of operation. As such, the switch transitions back to the high power first mode of operation where the plurality of light sources are permitted to illuminate. The switch may stay in this state until the motion detector has not detected a presence for a time period, and the switch transitions to the second low power mode of operation.

FIG. 3(A)-(D) depicts a graphical depiction of the switch in the various modes of operation in accordance with an implementation. In particular, FIGS. 3(A)-3(D) depict a rack or chassis with a first switch 310 and a second switch 315. In some implementations, these switches may be in a stacked configuration (i.e., daisy chained or trunked configuration). Each switch may have a power light source 320, a first port 325 with a first light source 330, a second port 335 with a second light source 340, a third port 345 with a third light source 350, and a debug/console port 355 with a debug/console light source 360. Each switch may also have a motion detector 365 which senses objects in an area 370 proximate to the switch.

FIG. 3(A) depicts operation during the first mode of operation. As discussed above, the first mode of operation is a high power mode where a plurality of light sources are permitted to illuminate, and may occur, for example, after the switch initializes. As shown in this example, the plurality of light sources may comprise the first, second, and third port light sources (330, 340, and 350) associated with the first, second, and third ports (325, 335, and 345). As further shown, each of these port light sources are illuminating in this mode to show, e.g., a communication link and/or activity on the communication link. As further shown, the power light source 320 is illuminated to show that the switch currently has power, and the debug/console light source 360 is not illuminated because there is no current connection via this port.

FIG. 3(B) depicts operation during the second mode of operation. As discussed above, the second mode of operation is a lower power mode where the plurality of light sources are not permitted to illuminate, and the mode is entered in response to not detecting a moving or stationary object for a predetermined time period. As shown in the example, there is no object in the area 370 proximate to the switch, and therefore the switch automatically transition to the second mode where the plurality of light sources (330, 340, and 350) are not permitted to illuminate even if there is e.g., a communication link and/or activity on the communication link. Other light sources (e.g., the power light source 320), however, are still permitted to illuminate. It should be understood that the light source groupings are configurable, and therefore an administrator may configure which light sources are responsive to the various modes via, e.g., a user interface, CLI, or the like.

Figure 3D:
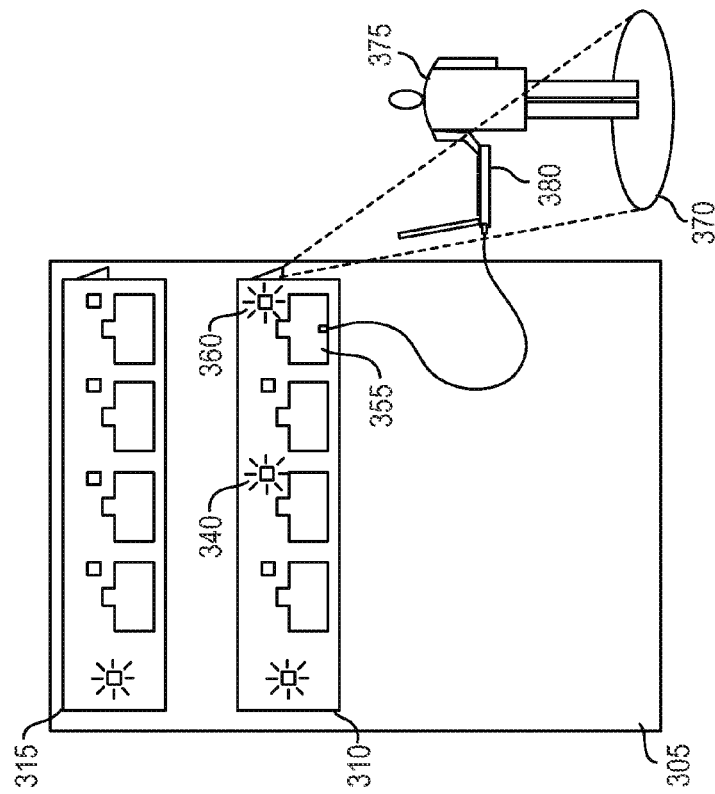
Figure 3C:
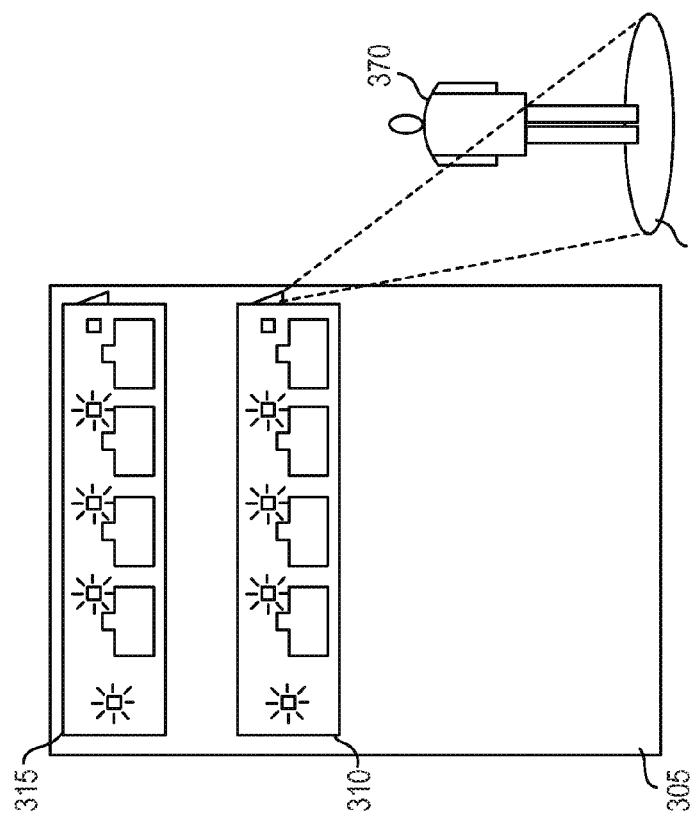

FIG. 3(C) depicts the switch re-entering the first mode of operation in response to the detecting an object or individual 375 in the area 370 proximate to the switch. As shown, the plurality of light sources (330, 340, and 350) are permitted to illuminate, and the power light source 320 continues to illuminate.

FIG. 3(D) depicts the switch entering the third mode of operation in response to receiving a command from a computing device 380 communicatively coupled to the switch. In particular, the computing device 380 is communicatively coupled to the debug/console port 355 and issues a command to the switch, via, e.g., a CLI application on the computing device 380. Upon receiving the command, the switch transitions to the third mode of operation where only a subset (340) of the plurality of light sources are permitted to illuminate and the remainder (330 and 350) of the plurality of light sources are not permitted to illuminate. In the example shown, light source 340 associated with port 335 is permitted to illuminate for debug reasons, but light sources 330 and 350 associated with ports 325 and 345 are not permitted to illuminate. In addition, the power light source 320 continues to illuminate, as does the debug/console light source 360 because a cable is plugged in the console/debug port 355. After the administrator 375 is finished debugging, the administrator 375 may issue another command via the computing device 380 to transition the switch back to the first mode (shown in FIG. 3(A)).

As shown in FIGS. 3(A)-(D), each switch in the rack/chassis may have an integrated motion detector. Thus, each switch may manage its own modes of operation based on detected objects. It should be understood, however, that is some implementations, the switches may communicate with one another and issue mode commands to one another. For example, in response to the first switch 310 receiving the command to enter the third mode of operation from the computing device 380, the first switch 310 may issue a command to the second switch 315 to not permit a plurality of light sources associated with the second switch to illuminate. Thereafter, after receiving the command to enter the first mode of operation from the computing device 380, the first switch 310 may issue a command to the second switch 315 to permit the plurality of light sources associated with the second switch 315 to illuminate. Hence, power is not unnecessarily consumed illuminating port light sources on the second switch 315 when the administrator is only debugging a port on the first switch 310.

Figure 4:
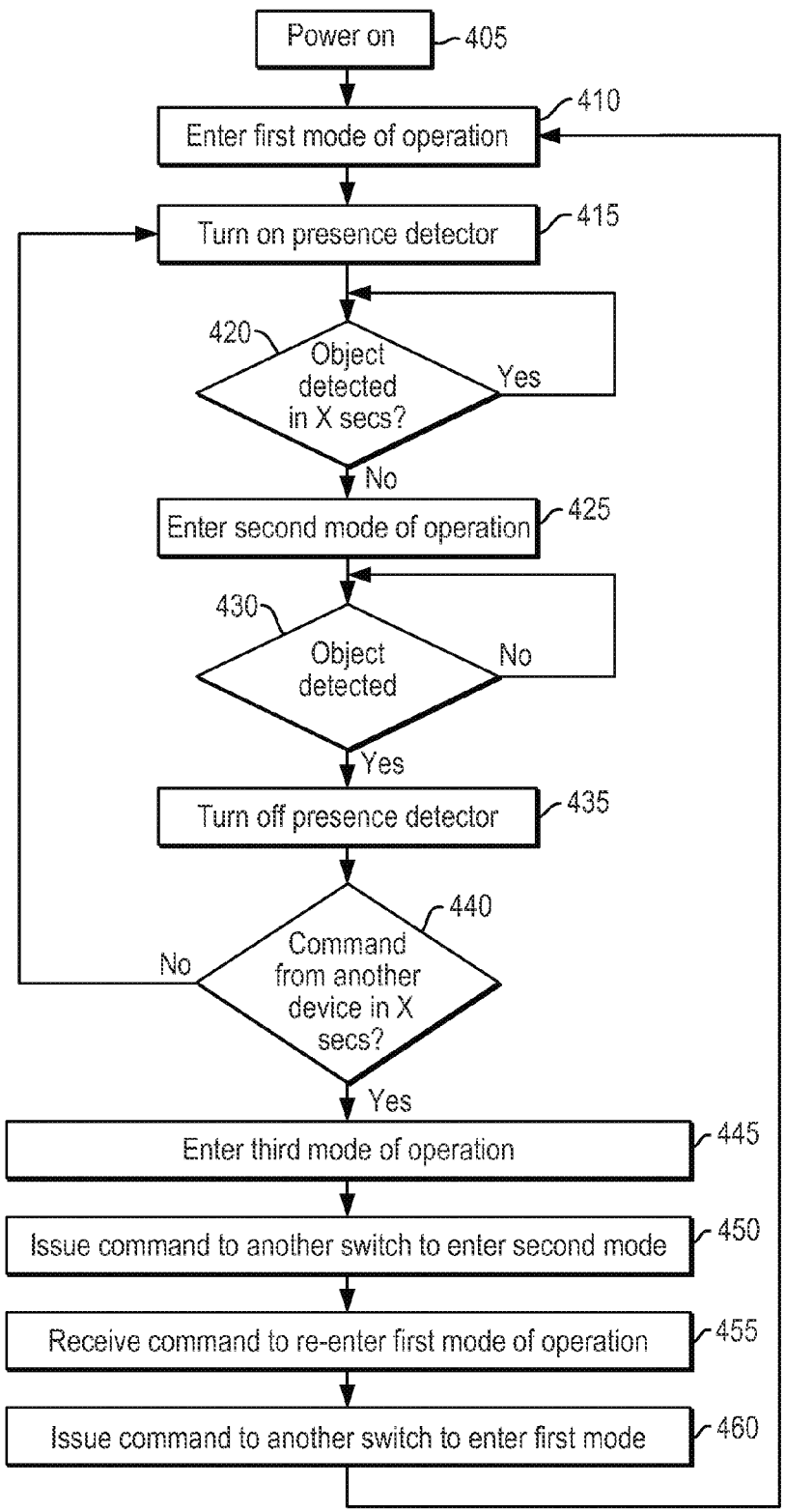
FIG. 4 depicts another example process flow diagram for reducing power consumption in accordance with an implementation.

FIG. 4 depicts an example process flow diagram 400 in accordance with an implementation. Similar to FIG. 2, it should be readily apparent that the processes represent generalized illustrations, and that other processes may be added or existing processes may be removed, modified, or rearranged without departing from the scope and spirit of the present disclosure. In addition, it should be understood that the processes may represent instructions stored on machine-readable storage medium that may cause a processor to respond, to perform actions, to change states, and/or to make decisions. Alternatively or in addition, the processes may represent functions and/or actions performed by functionally equivalent circuits like an analog circuit, a digital signal processing device circuit, an ASIC, and/or a logic device associated with a switch.

The process may begin at block 405, when the switch is powered-up. During this phase, the switch initializes, including potentially illuminating all light sources for a predetermined time period (e.g., 5 secs) to check functionality. At block, 410, the switch enters the first mode of operation where a plurality of light sources (e.g., port light sources) are permitted to illuminate, as discussed above. Before, during, or after block 410, the switch turns ON the presence detector at block 415. As mentioned, the presence detector detects moving or stationary objects proximate to the switch. At block 420, the switch determines whether an object has been detected in a predetermined time period (e.g., 45 seconds). If the answer is YES an object has been detected, the switch stays in the first mode of operation and continues to determine if an object has been detected in the predetermined time period. If, on the other hand, the answer is NO an object has not been detected for the predetermined time period, the switch transitions to the second mode of operation at block 425, where the plurality of light sources are not permitted to illuminate to reduce power consumption.

Thereafter, at block 430, the switch determines if an object has been detected. If the answer is NO an object has not been detected, the switch stays in the second mode of operation to save power. If, on the other hand, the answer is YES an object has been detected, the switch turns OFF the presence detector to reduce power consumption associated therewith at block 435, and determines whether a command is received from another device during a predetermined time period at block 440. For instance, the switch may determine whether a command has been received from a computing device coupled via the debug/console port in the last 180 seconds. If the answer is NO a command has not been received, the switch transitions back to block 415 where the presence detector turns back ON and enters the first mode of operation until an object is not detected for the applicable time period. If, on the other hand, the answer is YES a command was received, at block 445, the switch transitions to the third mode of operation where only a subset of the plurality of light sources are permitted to illuminate and the remainder of the plurality of light sources are not permitted to illuminate to reduce power consumption. Before, during, or after block 445, the switch issues a command to another switch (e.g., a stacked switch) to enter the second mode of operation (i.e., a low power state) at block 450.

Once the administrator is finished debugging the ports associated with the subset of light sources, at block 455, the administrator sends a command to the switch to re-enter the first mode of operation. Before, during, or after block 455, the switch sends a command to the another switch to also enter the first mode of operation.

As a consequence of the above-mentioned processes 400, power consumption for the switches is minimized because the light sources are generally not permitted to illuminate except after initialization and/or when an administrator is in front of the rack. Even when administrator is in front of the rack, power consumption is minimized by keeping most light sources OFF except for the port being debugged.

Figure 5:
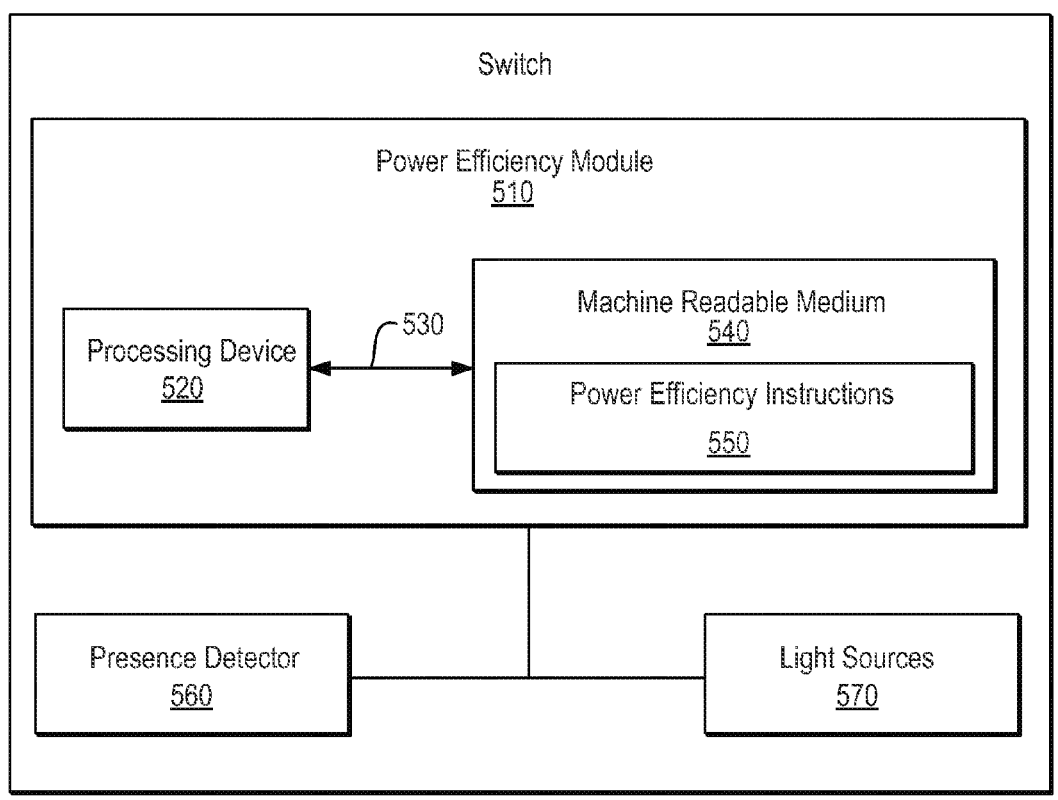
FIG. 5 depicts an example switch with a power efficiency module in accordance with an implementation.

FIG. 5 depicts an example switch 500 in accordance with an implementation. The switch 500 comprises a power efficiency module 510, a presence detector 560, and a plurality of light sources 570. The power efficiency module 510 comprises a processing device 520 and a non-transitory machine-readable medium 540 connected via a bus 530. The non-transitory machine-readable medium 540 may correspond to any typical storage device that stores instructions, such as programming code or the like. For example, the non-transitory machine-readable medium 540 may include one or more of a non-volatile memory, a volatile memory, and/or a storage device. Examples of non-volatile memory include, but are not limited to, electronically erasable programmable read only memory (EEPROM) and read only memory (ROM). Examples of volatile memory include, but are not limited to, static random access memory (SRAM) and dynamic random access memory (DRAM). Examples of storage devices include, but are not limited to, hard disk drives, compact disc drives, digital versatile disc drives, optical devices, and flash memory devices. In some implementations, the instructions may be part of an installation package that may be executed by the processing device 520. In this case, the non-transitory machine-readable medium 640 may be a portable medium such as a CD, DVD, or flash drive or a memory maintained by a server from which the installation package can be downloaded and installed. In another implementation, the instructions may be part of an application or application already installed.

The processing device 520 may be may be at least one of a processor, central processing unit (CPU), a semiconductor-based microprocessor, or the like. It may retrieve and execute instructions such as fetching, decoding, and the like to cause the switch 500 to operate in accordance with the foregoing description. In one example implementation, the processing device 520 may access the machine-readable medium 540 via the bus 530 to cause the switch 500 to enter the second mode of operation in response to the presence detector 560 not detecting a presence proximate to the switch 500 for a time period, wherein during the second mode of operation a plurality of light sources 570 are not permitted to illuminate. The instructions 550, when executed, may further cause the switch 500 to enter the first mode of operation in response to detecting a presence proximate to the switch 500, wherein during the first mode of operation the plurality of light sources 570 are permitted to illuminate. Additionally, the instructions 550, when executed, may further cause the switch 500 to enter the third mode of operation in response to receiving a first command, wherein during the third mode of operation only a subset of the plurality of light sources are permitted to illuminate and the remainder of the plurality of light sources associated with the plurality of ports are not permitted to illuminate. Furthermore, the instructions 550, when executed, may further cause the switch 500 to re-enter the first mode of operation in response to receiving a second command.

The foregoing describes a novel and previously unforeseen approach to reduce power consumption associated with illuminating light sources. While the description has focused on using this novel approach in switches, it should be understood that the approach may be used in other enterprise device such as servers, hard disks drive assemblies, blade servers, racks, and the like, Furthermore, while the above disclosure has been shown and described with reference to the foregoing examples, it should be understood that other forms, details, and implementations may be made without departing from the spirit and scope of the disclosure that is defined in the following claims.

What is claimed is:

1. A method to reduce power consumption, comprising:
   entering, by a first switch, a first mode of operation, wherein during the first mode of operation a plurality of light sources associated with the first switch are permitted to illuminate;
   entering, by the first switch, a second mode of operation, wherein during the second mode of operation the plurality of light sources associated with the first switch are not permitted to illuminate, and wherein the entering of the second mode of operation is in response to not detecting a presence proximate to the first switch for a time period;
   re-entering, by the first switch, the first mode of operation, wherein the re-entering of the first mode of operation is in response to detecting a presence proximate to the first switch;
   receiving, by the first switch, a command to enter a third mode of operation, wherein during the third mode of operation only a subset of the plurality of light sources are permitted to illuminate and the remainder of the plurality of light sources are not permitted to illuminate; and
   entering, by the first switch, the third mode of operation.

2. The method of claim 1, further comprising:
   receiving, by the first switch, a command to re-enter the first mode of operation; and
   entering, by the first switch, the first mode of operation.

3. The method of claim 1, further comprising:
   transmitting, from the first switch and to a second switch, a command to not permit a plurality of light sources associated with the second switch to illuminate, wherein the command is transmitted by the first switch in response to the first switch receiving the command to enter the third mode of operation.

4. The method of claim 3, further comprising:
   transmitting, from the first switch and to the second switch, a command to permit the plurality of light sources associated with the second switch to illuminate, wherein the command is transmitted by the first switch in response to the first switch receiving a command to re-enter the first mode of operation.

5. The method of claim 1, wherein the plurality of light sources associated with the first switch comprise at least one of activity light sources and link light sources associated with ports on the first switch.

6. The method of claim 1, wherein the subset of the plurality of light sources comprises at least one of an activity light sources and a link light source associated with a malfunctioning port.

7. The method of claim 1, wherein a presence detector associated with the first switch is disabled during the third mode of operation, and wherein the presence detector is enabled during the first and second mode of operation.

8. A first switch, comprising:
   a plurality of ports;
   a plurality of light sources associated with the plurality of ports;
   a presence detector to detect presence proximate to the switch; and
   a power efficiency module communicatively coupled to the presence detector and the plurality of light sources, wherein the power efficiency module is to
   cause the first switch to enter a second mode of operation in response to the presence detector not detecting a presence proximate to the first switch for a time period, wherein during the second mode of operation the plurality of light sources associated with the plurality of ports are not permitted to illuminate;

cause the first switch to enter a first mode of operation in response to the presence detector detecting a presence proximate to the first switch, wherein during the first mode of operation the plurality of light sources associated with the plurality of ports are permitted to illuminate; and cause the first switch to enter a third mode of operation in response to receiving a first command, wherein during the third mode of operation only a subset of the plurality of light sources associated with the plurality of ports are permitted to illuminate and the remainder of the plurality of light sources associated with the plurality of ports are not permitted to illuminate.

9. The first switch of claim 8, wherein the power efficiency module is further to:

cause the first switch to re-enter the first mode of operation in response to receiving a second command.

10. The first switch of claim 9, wherein the first command and second command are received from a computing device separate from the first switch hut communicatively coupled to the first switch.

11. The first switch of claim 8, wherein the power efficiency module is further to:

cause the first switch to transmit a third command to a second switch in response to receiving the first command, wherein the third command directs the second switch to not permit a plurality of light sources associated with the second switch to illuminate.

12. The first switch of claim 11, wherein the power efficiency module is further to:

cause the first switch to transmit a fourth command to the second switch, wherein the fourth command directs the second switch to permit the plurality of light sources associated with the second switch to illuminate.

13. The first switch of claim 8, wherein the power efficiency module is further to:

cause the first switch to transmit a third command to a plurality of switches in response to receiving the first command, wherein the third command directs the plurality of switches to not permit a plurality of light sources associated with the plurality of switches to illuminate.

14. The first switch of claim 13, wherein the power efficiency module is further to:

cause the first switch to transmit a fourth command to the plurality of switches, wherein the fourth command directs the plurality of switches to permit the plurality of light sources associated with the plurality of light sources to illuminate.

15. The first switch of claim 8, wherein the power efficiency module is further to:

disable the presence detector upon entering the third mode of operation, and re-enable the presence detector upon re-entering the first mode of operation.

16. The first switch of claim 8, wherein the plurality of light sources associated with the plurality of ports comprise at least one of activity light sources and link light sources.

17. The first switch of claim 8, wherein the subset of the plurality of light sources are associated with one or more malfunctioning ports.

18. A non-transitory machine-readable medium comprising instructions that, when executed, cause a device to:

enter a second mode of operation in response to not detecting a presence proximate to the device for a time period, wherein during the second mode of operation a plurality of light sources are not permitted to illuminate;

enter a first mode of operation in response to detecting a presence proximate to the device, wherein during the first mode of operation the plurality of light sources are permitted to illuminate;

enter a third mode of operation in response to receiving a first command, wherein during the third mode of operation only a subset of the plurality of light sources are permitted to illuminate and the remainder of the plurality of light sources associated with the plurality of ports are not permitted to illuminate; and re-enter the first mode of operation in response to receiving a second command.

19. The non-transitory machine-readable medium of claim 18, wherein the plurality of light sources are port light sources.

20. The non-transitory machine-readable medium of claim 18, comprising further instructions that, when executed, cause the device to:

transmit a command to another device to enter a mode of operation where a plurality of light sources associated with the device are not permitted to illuminate.

* * * * *

UNITED STATES PATENT AND TRADEMARK OFFICE
CERTIFICATE OF CORRECTION

PATENT NO. : 8,941,330 B2
APPLICATION NO. : 13/848516
DATED : January 27, 2015
INVENTOR(S) : Kay Seah Ng et al.

It is certified that error appears in the above-identified patent and that said Letters Patent is hereby corrected as shown below:

In the Claims

In column 11, line 22, in Claim 10, delete "hut" and insert -- but --, therefor.

Signed and Sealed this
Nineteenth Day of May, 2015

Michelle K. Lee
*Director of the United States Patent and Trademark Office*